US012249452B2

(12) United States Patent
Adachi et al.

(10) Patent No.: US 12,249,452 B2
(45) Date of Patent: Mar. 11, 2025

(54) IGNITION COIL FOR USE IN INTERNAL COMBUSTION ENGINE

(71) Applicant: DIAMOND & ZEBRA ELECTRIC MFG.CO., LTD., Osaka (JP)

(72) Inventors: Kohei Adachi, Osaka (JP); Shintaro Yamamura, Osaka (JP); Eiji Kawaguchi, Osaka (JP)

(73) Assignee: DIAMOND&ZEBRA ELECTRIC MFG.CO., LTD., Osaka (JP)

( * ) Notice: Subject to any disclaimer, the term of this patent is extended or adjusted under 35 U.S.C. 154(b) by 680 days.

(21) Appl. No.: 17/671,266

(22) Filed: Feb. 14, 2022

(65) Prior Publication Data

US 2022/0310307 A1 Sep. 29, 2022

(30) Foreign Application Priority Data

Mar. 23, 2021 (JP) ................................ 2021-049164

(51) Int. Cl.
*H01F 38/12* (2006.01)
*F02P 3/04* (2006.01)
(Continued)

(52) U.S. Cl.
CPC ................ *H01F 27/29* (2013.01); *F02P 3/04* (2013.01); *H01F 27/02* (2013.01); *H01F 27/34* (2013.01); *H01F 38/12* (2013.01)

(58) Field of Classification Search
CPC .......... H01F 27/29; H01F 27/02; H01F 27/34; H01F 38/12; H01F 2038/122;
(Continued)

(56) References Cited

U.S. PATENT DOCUMENTS

2014/0020667 A1 1/2014 Ishiguro
2014/0043717 A1* 2/2014 Takahashi ................ F02P 3/02 361/263

(Continued)

FOREIGN PATENT DOCUMENTS

DE 102010027945 * 10/2011
JP 2008-021794 A 1/2008

(Continued)

OTHER PUBLICATIONS

Office Action dated Apr. 30, 2024 from corresponding Japanese Patent Application No. JP 2021-049164, 9 pages.

(Continued)

*Primary Examiner* — Mang Tin Bik Lian
(74) *Attorney, Agent, or Firm* — Rimon P.C.

(57) ABSTRACT

An ignition coil for use in an internal combustion engine includes a coil assembly including a primary coil and a secondary coil, a lead terminal electrically connected to the secondary coil, a noise prevention resistor connected to a spark plug, and a case. An internal space of the case includes a first space holding the coil assembly and the lead terminal and a second space including the noise prevention resistor. The case includes a pair of guides protruding toward the first space. The lead terminal passes through a gap between the pair of guides and is in contact with an exposed surface of the noise prevention resistor. This can reduce deviation of the lead terminal. As a result, the secondary coil and the noise prevention resistor can be electrically connected to each other without intervention of a high-voltage terminal therebetween.

8 Claims, 10 Drawing Sheets

(51) Int. Cl.

| | |
|---|---|
| ***H01F 27/02*** | (2006.01) |
| ***H01F 27/29*** | (2006.01) |
| ***H01F 27/34*** | (2006.01) |

(58) Field of Classification Search

CPC .. H01F 2038/127; H01F 5/04; H01F 27/2828; H01F 27/40; F02P 3/04

See application file for complete search history.

(56) References Cited

U.S. PATENT DOCUMENTS

| | | | | |
|---|---|---|---|---|
| 2014/0226253 | A1* | 8/2014 | Kawai | H01F 38/12 361/263 |
| 2016/0115935 | A1* | 4/2016 | Tada | F02P 3/04 315/209 T |
| 2017/0040104 | A1* | 2/2017 | Akimoto | H01T 13/44 |
| 2017/0301461 | A1* | 10/2017 | Kato | H01F 27/325 |
| 2017/0342954 | A1* | 11/2017 | Kawai | H01F 5/04 |
| 2018/0294092 | A1* | 10/2018 | Sato | H01F 38/12 |
| 2019/0162156 | A1* | 5/2019 | Kondo | H01F 38/12 |
| 2019/0165550 | A1* | 5/2019 | Akimoto | F02P 3/04 |
| 2020/0158071 | A1* | 5/2020 | Kondo | H01F 27/29 |

FOREIGN PATENT DOCUMENTS

| | | |
|---|---|---|
| JP | 2010-182842 A | 8/2010 |
| JP | 2014-022183 A | 2/2014 |
| JP | 2019-062040 A | 4/2019 |
| JP | 2020-056362 A | 4/2020 |

OTHER PUBLICATIONS

Indian Examination Report issued in corresponding Indian Patent Application No. 202244008618, dated Sep. 27, 2022, with English translation.

* cited by examiner

IGNITION COIL FOR USE IN INTERNAL COMBUSTION ENGINE

RELATED APPLICATIONS

This application claims the benefit of Japanese Application No. 2021-49164, filed on Mar. 23, 2021, the disclosure of which is incorporated by reference herein.

BACKGROUND OF THE INVENTION

Field of the Invention

The present invention relates to an ignition coil for use in an internal combustion engine.

Description of the Background Art

In an ignition coil for use in an internal combustion engine, it is required to certainly transmit a voltage increased by a coil assembly to a spark plug that performs an ignition operation. For this reason, there is a desire for highly reliable electrical connection between parts forming the ignition coil for use in an internal combustion engine.

In some cases, a noise prevention resistor for reducing ignition noises is intervened between a coil assembly and a spark plug. A configuration with such a noise prevention resistor placed between a secondary coil generating a high voltage in a coil assembly and a spark plug is disclosed in Japanese Patent Application Laid-Open No. 2019-062040, for example.

In an ignition coil for use in an internal combustion engine of Japanese Patent Application Laid-Open No. 2019-062040, one end of a secondary coil (13) generating a high voltage is electrically connected to one end of a terminal pin (14). The terminal pin (14) is a hard conductive metal member (refer to the paragraph [0016]). Meanwhile, high-voltage terminals (16, 17) are placed and fixed in a high-voltage tower part (20) forming an ignition coil case (10) provided on a spark-plug side. Further, the high-voltage terminals (16, 17) are bonded to (fitted into, for example) and fixed to resistance electrodes (18*a*, 18*b*) provided at both ends of a noise prevention resistor (18). The noise prevention resistor (18) is a fixed resistor formed in a columnar shape, and the resistance electrodes (18*a*, 18*b*) are made of a coronary conductive material (refer to the paragraph [0017]). The high-voltage terminal (16) has a diameter larger than that of the noise prevention resistor (18) (refer to FIG. 1 and the like). The other end of the above-mentioned terminal pin (14) is electrically connected to the high-voltage terminal (16).

However, intervening the high-voltage terminal (16) between the secondary coil (13) and the noise prevention resistor (18) causes a risk of increasing manufacturing cost. Then, one possible way to reduce manufacturing cost is to connect the above-mentioned terminal pin fixed to the secondary coil and the noise prevention resistor directly to each other, for example, without intervention of the high-voltage terminal. Nonetheless, the diameter of the noise prevention resistor is small. This makes it difficult to electrically connect the terminal pin to the noise prevention resistor and keep excellent connection therebetween while keeping the original shape of the terminal pin.

SUMMARY OF THE INVENTION

The present invention is intended to provide a technique allowing electrical connection between a secondary coil and a noise prevention resistor without intervention of a high-voltage terminal therebetween.

To solve the foregoing problem, a first aspect of the present invention is intended for an ignition coil for use in an internal combustion engine. The ignition coil includes: a coil assembly including a primary coil and a secondary coil; a lead terminal electrically connected to the secondary coil; a noise prevention resistor electrically connected to a spark plug that performs an ignition operation in a combustion chamber of the internal combustion engine, the noise prevention resistor being configured to reduce an ignition noise; and a case holding the coil assembly, the lead terminal, and the noise prevention resistor, wherein an internal space of the case includes; a first space holding the coil assembly and the lead terminal; and a second space that is continuous with the first space and holds the noise prevention resistor, the case includes a pair of guides protruding toward the first space, and while the coil assembly, the lead terminal, and the noise prevention resistor are held in the case, the lead terminal passes through a gap between the pair of guides and is in contact with an exposed surface exposed to the first space in the noise prevention resistor.

According to the first aspect of the present invention, the lead terminal electrically connected to the secondary coil passes through the gap between the pair of guides and is in contact with the exposed surface of the noise prevention resistor. This reduces transverse deviation of the lead terminal from an extending direction of the lead terminal. As a result, the secondary coil and the noise prevention resistor can be electrically connected to each other without intervention of a high-voltage terminal therebetween.

DESCRIPTION OF THE PREFERRED EMBODIMENTS

Hereinafter, an exemplary preferred embodiment of the present invention will be described below with reference to the drawings.

1. First Preferred Embodiment

1-1. Configuration of Ignition Coil for Use in Internal Combustion Engine

Figure 1:
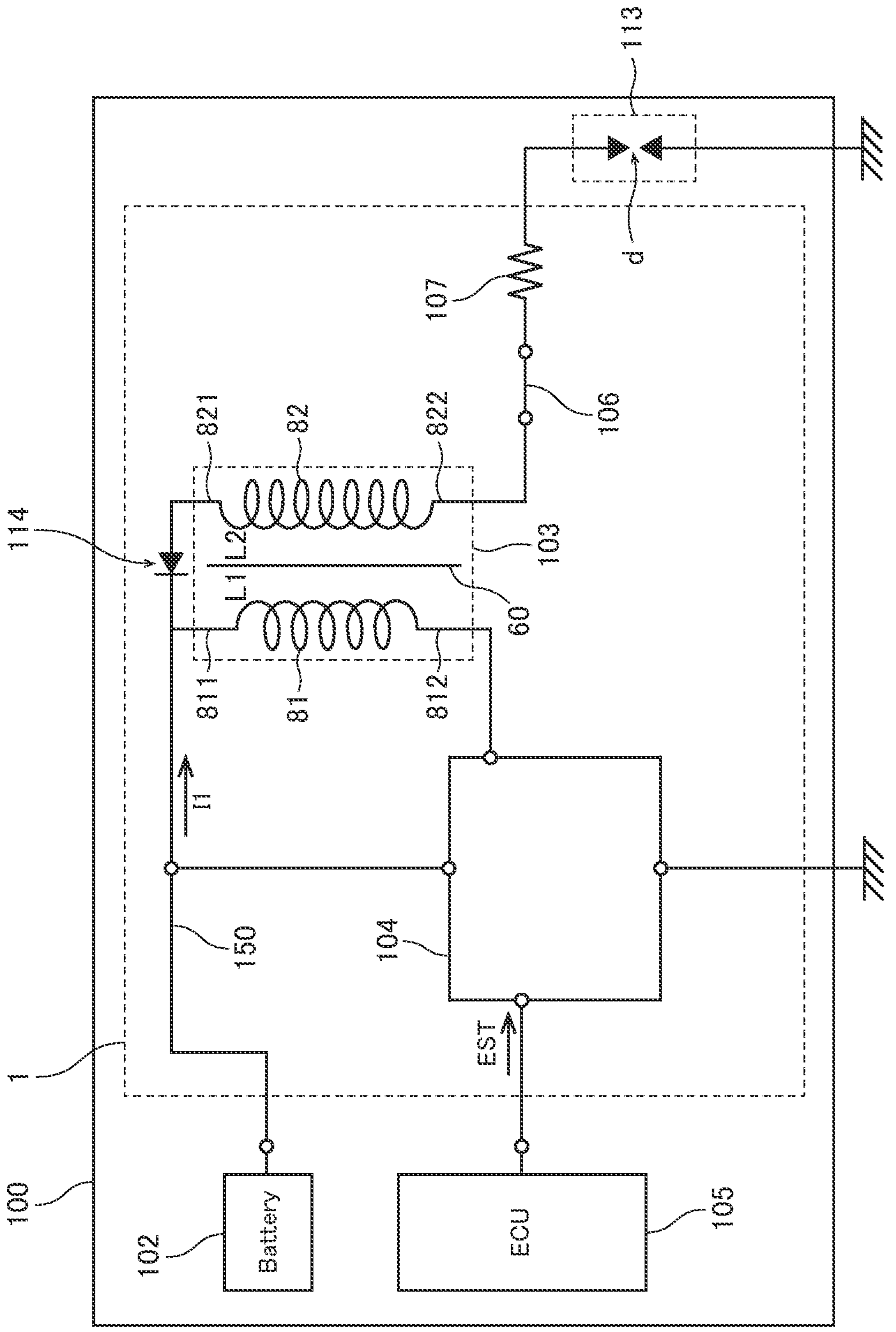
FIG. 1 is a block diagram schematically showing an operating environment of an ignition coil for use in an internal combustion engine according to a first preferred embodiment.

First, the configuration of an ignition coil 1 for use in an internal combustion engine corresponding to a first preferred embodiment of the present invention will be described with reference to the drawings. FIG. 1 is a block diagram schematically showing an operating environment of the ignition coil 1 for use in an internal combustion engine according to the first preferred embodiment. As described later, a primary coil L1 and a secondary coil L2 of a coil assembly 103 included in the ignition coil 1 for use in an internal combustion engine are arranged in a direction in which these coils are stacked on each other. However, the coils are illustrated in positions adjacent to each other in FIG. 1, for easier understanding.

The ignition coil 1 for use in an internal combustion engine according to the first preferred embodiment is a device installed on a vehicle body 100 of a vehicle such as an automobile, for example, and used for applying a high voltage for generating spark discharge at a spark plug 113 for use in an internal combustion engine. As shown in FIG. 1, the vehicle body 100 includes the spark plug 113, a battery 102, and an engine control unit (ECU) 105, in addition to the ignition coil 1 for use in an internal combustion engine.

The spark plug 113 is a device for performing an ignition operation in a combustion chamber of an internal combustion engine. The spark plug 113 is electrically connected to one end 822 of the secondary coil L2 of the coil assembly 103 via a lead terminal 106 and a noise prevention resistor 107. When a high voltage is induced in the secondary coil L2 of the coil assembly 103, discharge occurs at a gap d in the spark plug 113 to generate sparks. As a result, fuel filling the internal combustion engine is ignited.

The battery 102 is a power supply that can be charged and discharged with DC power. The battery 102 is a storage battery. In the first preferred embodiment, the battery 102 is electrically connected to the primary coil L1 of the coil assembly 103 and an igniter 104. The battery 102 supplies a DC voltage to the primary coil L1 of the coil assembly 103 and the igniter 104.

The ECU 105 is an existing computer that controls the motions and the like of a transmission and an air bag in the vehicle body 100 comprehensively.

Figure 3:
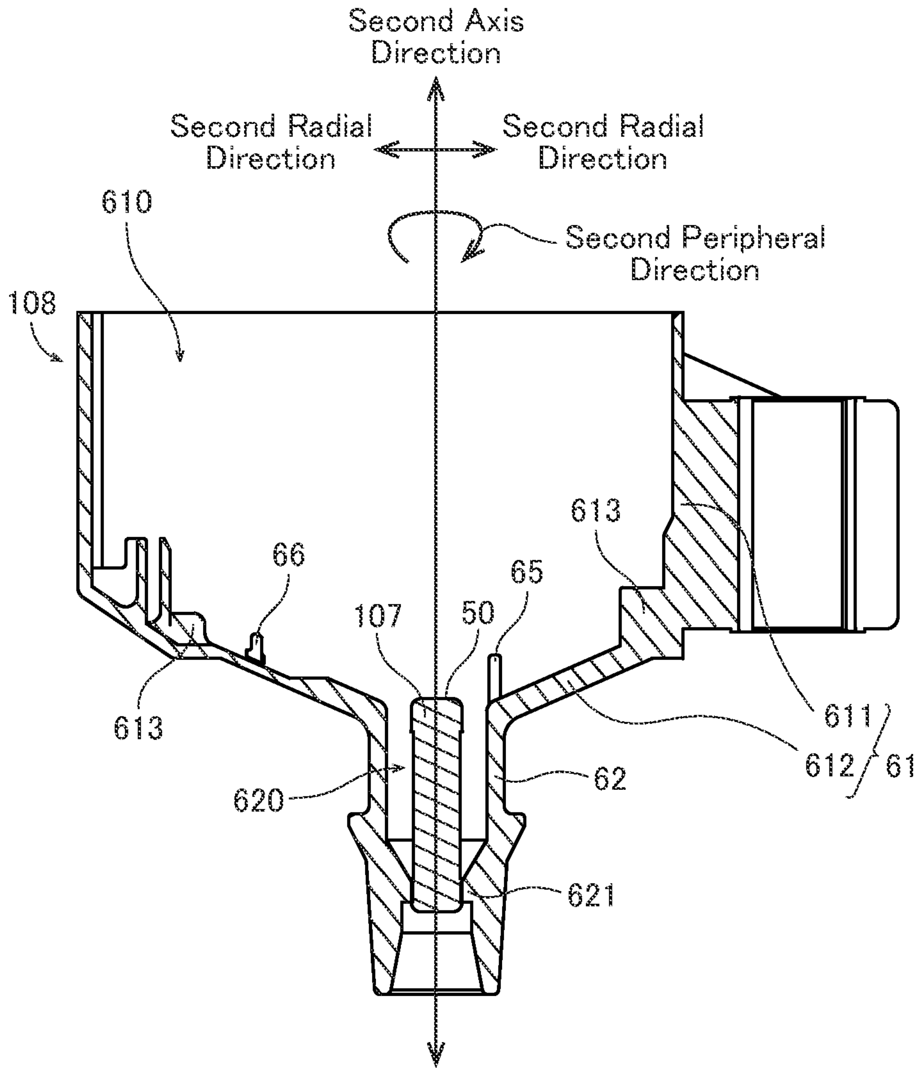
FIG. 3 is a longitudinal sectional view of a noise prevention resistor and a case according to the first preferred embodiment.

The ignition coil 1 for use in an internal combustion engine includes the coil assembly 103, the igniter 104, the lead terminal 106, the noise prevention resistor 107, and a case 108 (refer to FIG. 3 described later, and the like).

Figure 2:
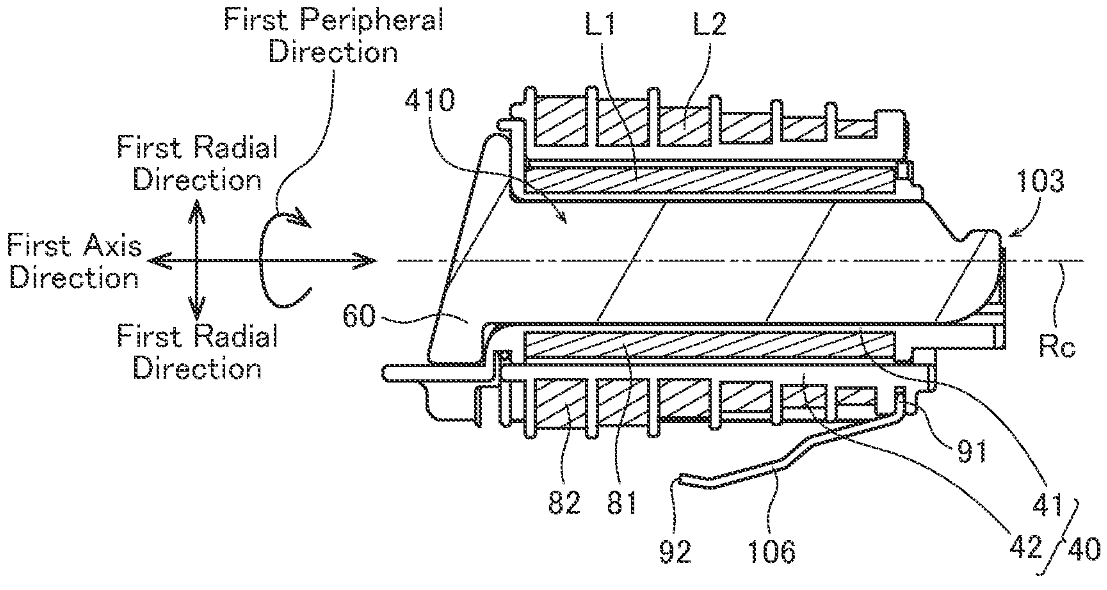
FIG. 2 is a longitudinal sectional view of a coil assembly and a lead terminal according to the first preferred embodiment.

FIG. 2 is a longitudinal sectional view of the coil assembly 103 and the lead terminal 106. As shown in FIG. 2, the coil assembly 103 includes a bobbin 40, the primary coil L1, the secondary coil L2, and an iron core 60. In the following description about the coil assembly 103, a direction parallel to the center axis of the bobbin 40 will be referred to as a "first axis direction", a direction perpendicular to the center axis of the bobbin 40 will be referred to as a "first radial direction", and a direction along an arc centered on the center axis of the bobbin 40 will be referred to as a "first peripheral direction". Meanwhile, the terms "a direction parallel to" include a substantially parallel direction, and the terms "a direction perpendicular to" include a substantially perpendicular direction.

The bobbin 40 includes a primary bobbin 41 and a secondary bobbin 42 that can be coupled to each other. Each of the primary bobbin 41 and the secondary bobbin 42 extends in a tubular shape along the first axis direction. The secondary bobbin 42 is arranged external to the primary bobbin 41 along the first radial direction. As a material of the primary bobbin 41 and the secondary bobbin 42, resin is used, for example.

The primary coil L1 is formed by winding of a conductor on the outer surface of the primary bobbin 41 about a winding center axis Rc in the first peripheral direction. Hereinafter, the conductor wound on the outer surface of the primary bobbin 41 will be referred to as a "first conductor 81". The winding center axis Rc is substantially coincident with the above-described center axis of the bobbin 40. After the primary coil L1 is formed, the secondary bobbin 42 is placed so as to cover the outer surface of the primary coil L1 and is coupled to the primary bobbin 41. This reduces deviation of the primary bobbin 41 and the secondary bobbin 42 from each other in the first axis direction, the first radial direction, or the first peripheral direction. Further, a secondary conductor 82 different from the primary conductor 81 is wound on the outer surface of the secondary bobbin 42 about the winding center axis Rc in the first peripheral direction, thereby forming the secondary coil L2. Arranging the primary coil L1 and the secondary coil L2 so as to be stacked on each other in the above-described manner can reduce the whole size of the coil assembly 103 including those coils. However, the primary coil L1 and the secondary coil L2 are not necessarily required to be subjected to winding of conductors while being stacked on each other as described. The coils may be arranged in positions adjacent to each other as shown in FIG. 1.

The iron core 60 has a configuration in which a center iron core 601 and an outer iron core 602 described later are combined together. Each of the center iron core 601 and the outer iron core 602 of the iron core 60 is formed of a stacked steel plate with a stack of silicon steel plates, for example. The center iron core 601 extends along the first axis direction. Further, the center iron core 601 is inserted through a space 410 on the inner side in the first radial direction with respect to the primary bobbin 41. The outer iron core 602 connects both ends of the center iron core 601 along the first axis direction (refer to FIG. 4 described later). As a result, the iron core 60 forms a closed magnetic circuit configuration in which the primary coil L1 and the secondary coil L2 are electromagnetically coupled to each other.

As shown in FIG. 1, the primary conductor 81 forming the primary coil L1 has one end 811 connected to a power supply line 150. The power supply line 150 is a conductor extending from the battery 102. The primary conductor 81 has the other end 812 connected to the igniter 104 described later. Under control of the igniter 104, a DC low voltage supplied from the battery 102 is applied to the one end 811 of the primary coil L1. Then, a gradually increasing primary current I1 starts to flow through the primary coil L1.

The secondary conductor 82 forming the secondary coil L2 has one end 822 connected to the spark plug 113. The wire diameter of the secondary conductor 82 is smaller than the wire diameter of the primary conductor 81. The number of turns (10000 turns, for example) of the secondary conductor 82 on the secondary coil L2 is approximately 100 times the number of turns (100 turns, for example) of the primary conductor 81 on the primary coil L1, or more. Thus, the coil assembly 103 increases DC low-voltage power supplied from the battery 102 to as high as thousands of volts at the time of interruption of the primary current I1. That is, a high voltage is induced in the secondary coil L2. Then, the secondary coil L2 supplies the induced high-voltage power to the spark plug 113 via the lead terminal 106 and the noise prevention resistor 107. As a result, electric sparks are generated in the spark plug 113 and fuel is ignited.

As shown in FIG. 1, in the first preferred embodiment, the secondary coil L2 is further connected in series to a diode 114 whose forward direction is a direction toward the power supply line 150, at the other end 821. The other end 821 is an end opposite to the one end 822 connected to the spark plug 113 in the secondary coil L2. Because of this series connection, an induced current caused due to a voltage induced by the gradually increasing primary current I1 in the secondary coil L2 is prevented from flowing toward the spark plug 113 in the reverse direction.

The igniter 104 is a semiconductor device that is connected to the primary coil L1 and controls a current flowing through the primary coil L1. The igniter 104 is supplied with a DC voltage for activating the igniter 104 from the battery 102 as described above. Further, the igniter 104 is electrically connected to the ECU 105 and receives a signal from the ECU 105. Hereinafter, a signal received from the ECU 105 will be referred to as an "EST signal". The igniter 104 functions as a switch that controls passage and interruption of a current flowing through the primary coil L1 in response to an EST signal. The igniter 104 may be formed integrally with an electronic circuit of the ECU 105.

The lead terminal 106 is a hard slender bar-shaped member having conductivity. In the first preferred embodiment, brass is used as a material forming the lead terminal 106. However, the material of the lead terminal 106 is not limited to that. One end 91 on a base side in the lead terminal 106 is fixed to the secondary bobbin 42. Further, the secondary conductor 82 forming the secondary coil L2 is wound on the one end 91 and is fixed by soldering not shown in the drawings, for example. As a result, the lead terminal 106 is electrically connected directly to the secondary conductor 82 of the secondary coil L2. However, the lead terminal 106 may be fixed indirectly to the secondary conductor 82 via a member provided separately. The lead terminal 106 extends toward a tip side along the winding center axis Rc of the coil assembly 103 while having the one end 91 placed on the secondary bobbin 42. More specific configuration of the lead terminal 106 will be described later.

The noise prevention resistor 107 is a member for reducing ignition noises in the ignition coil 1 for use in an internal combustion engine. As described above, the noise prevention resistor 107 is electrically connected to the spark plug 113. FIG. 3 is a longitudinal sectional view of the noise prevention resistor 107 and the case 108 (not including a connector 63 and a lid 64 described later). As shown in FIG. 3, the noise prevention resistor 107 has a substantially cylindrical shape.

Figure 4:
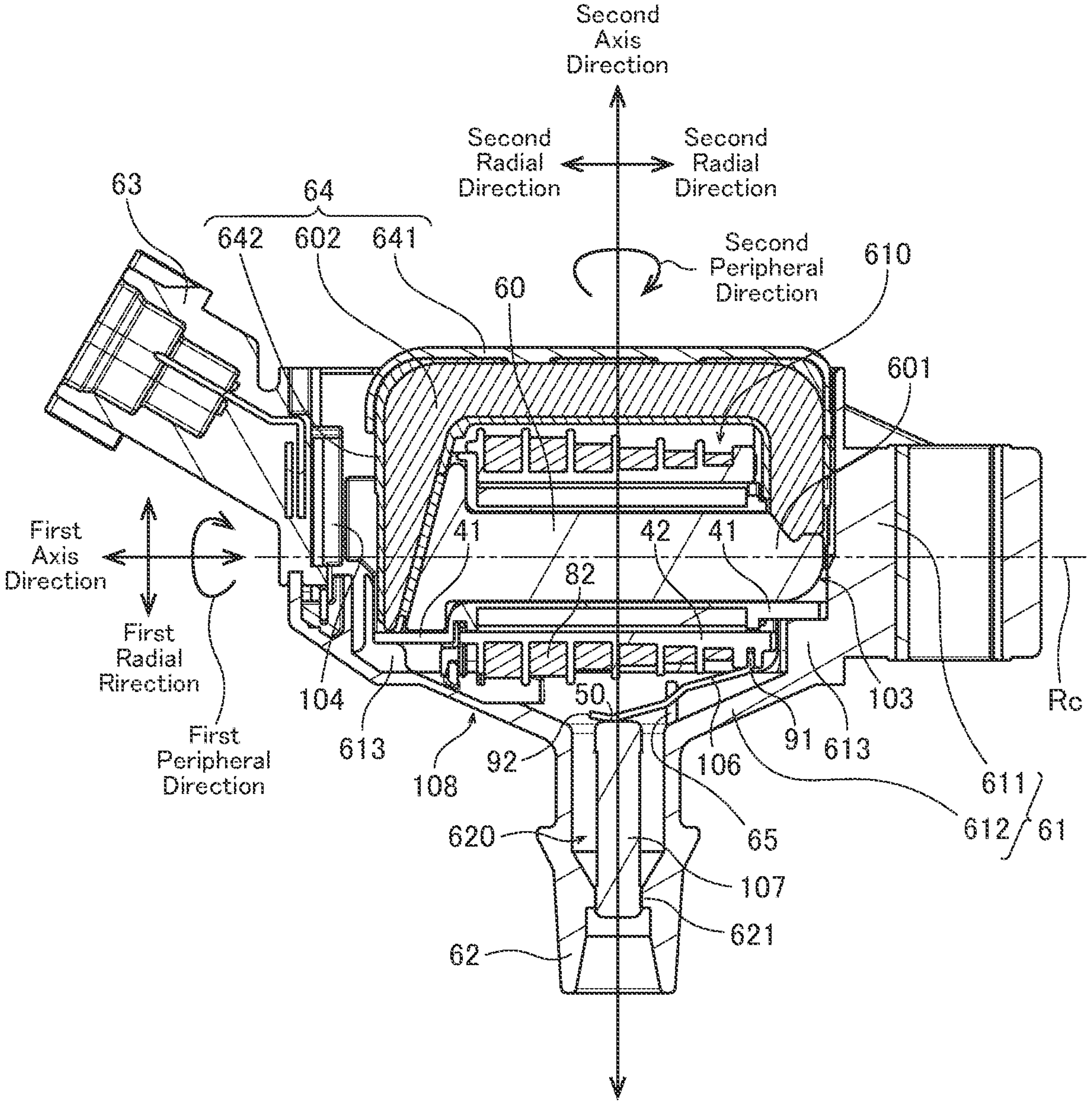
FIG. 4 is a longitudinal sectional view of the coil assembly, an igniter, the lead terminal, and the noise prevention resistor that are held in the case, according to the first preferred embodiment.

The case 108 is a container made of resin, for holding the coil assembly 103, the igniter 104, the lead terminal 106, and the noise prevention resistor 107. FIG. 4 is a longitudinal sectional view of the coil assembly 103, the igniter 104, the lead terminal 106, and the noise prevention resistor 107 that are held in the case 108. As shown in FIG. 4, the case 108 includes a first holding section 61, a second holding section 62, the connector 63, and the lid 64. In the following description about the case 108, a direction in which the first holding section 61 and the second holding section 62 are adjacent to each other in FIG. 4 will be referred to as a "second axis direction", a direction perpendicular to the center axis of the first holding section 61 and the second holding section 62 will be referred to as a "second radial direction", and a direction along an arc centered on the center axis of the first holding section 61 and the second holding section 62 will be referred to as a "second peripheral direction". Meanwhile, the terms "a direction parallel to" include a substantially parallel direction, and the terms "a direction perpendicular to" include a substantially perpendicular direction.

The first holding section 61 includes a first tubular part 611 and the first bottom 612. The first tubular part 611 extends in a tubular shape along the second axis direction. The first bottom 612 has a shape of a funnel that becomes gradually narrower as it heads from one of ends along the second axis direction in the first tubular part 611 toward the side where the one end is extended, and also has a shape of a ring. In an internal space of the case 108, a first space 610 corresponding to an internal space of the first holding section 61 holds the coil assembly 103 and the lead terminal 106. Further, two rectangular-parallelepiped-shaped supporting parts 613 protruding toward the first space 610 are formed near a boundary between the first tubular part 611 and the first bottom 612.

The second holding section 62 extends in a tubular shape along the second axis direction, from one of ends along the second axis direction in the first bottom 612 toward the side where the one end is extended. In an internal space of the case 108, a second space 620 corresponding to an internal space of the second holding section 62 is continuous with the above-described first space 610. The second space 620 holds the noise prevention resistor 107.

Further, the second holding section 62 includes an inwardly protruding part 621. The inwardly protruding part 621 protrudes inwardly along the second radial direction from the whole circumference of a part extending along the second axis direction in the second holding section 62. The noise prevention resistor 107 is inserted into an inner side in the second radial direction with respect to the inwardly protruding part 621 and is fixed by press-fitting. The noise prevention resistor 107 is fixed in such a manner that its lengthwise direction is set along the second axis direction. Further, the noise prevention resistor 107, while being fixed by press-fitting, extends along the second axis direction through the center axis of the second holding section 62. The noise prevention resistor 107 is previously held in the second space 620 before the coil assembly 103 and the lead terminal 106 are held in the first space 610. Moreover, in the noise prevention resistor 107, the surface of one of ends along the second axis direction is an exposed surface 50 exposed to the first space 610.

As described above, the first space 610 holds the coil assembly 103. As shown in FIG. 4, the coil assembly 103 is held in the first space 610 in such a manner that its first axis direction is set along the second radial direction of the case 108. At that time, the primary bobbin 41 of the coil assembly 103 comes into contact with the supporting parts 613. As a result, the coil assembly 103 is supported while being aligned to the second axis direction.

Further, the igniter 104 is placed next to the coil assembly 103. As described above, the igniter 104 is electrically connected to the other end 812 of the primary conductor 81. Moreover, the connector 63 is connected beside the first holding section 61. A wire extending from the igniter 104 and the power supply line 150 extending from the primary conductor 81 are led out to the outside of the ignition coil 1 for use in an internal combustion engine via the inside of the connector 63, and are connected to the ECU 105 or the battery 102.

The U-shaped lid 64 is put so as to cover the coil assembly 103 held in the first space 610 inside the first holding section 61. The lid 64 is inserted into the innermost side of the first holding section 61 while exposing its bottom (a cap 641 described later and a part of the outer iron core 602). The lid 64 presses the primary bobbin 41 and the center iron core 601 toward the above-described two supporting parts 613 in the second axis direction. This limits the movement of the primary bobbin 41 and the center iron core 601 in the second axis direction.

The lid 64 includes the outer iron core 602, the cap 641, and a cover 642. The outer iron core 602 forms a part of the lid 64 as described above, and also forms a part of the iron core 60 of the coil assembly 103. While the lid 64 is inserted into the innermost side of the first holding section 61, the outer iron core 602 passes through a region that is external to the secondary bobbin 42 and the secondary conductor 82 along the first radial direction, and connects both axial ends of the center iron core 601. As a result, the iron core 60 forms a closed magnetic circuit configuration in which the primary coil L1 and the secondary coil L2 are electromagnetically coupled to each other.

The cap 641 is a member that covers a part of the outer iron core 602 exposed from the first holding section 61 to protect the outer iron core 602. As a material of the cap 641, resin of high durability such as PBT, PPS, or PET, is used, for example. The cover 642 covers a surface facing the igniter 104 in the outer iron core 602, or the like. As a material of the cover 642, elastomer is used, for example.

1-2. Specific Configurations of Lead Terminal and Case

Next, more specific configurations of the lead terminal 106 and the case 108 will be described.

As described above, the base-side one end 91 of the lead terminal 106 is fixed to the secondary bobbin 42. On the one end 91, the secondary conductor 82 forming the secondary coil L2 is wound and is fixed by soldering, for example. Further, while the coil assembly 103, the lead terminal 106, and the noise prevention resistor 107 are held in the case 108, the lead terminal 106 extends along the winding center axis Rc. Then, the lead terminal 106 is inclined substantially in a direction in which it gets closer to the noise prevention resistor 107 as it heads from the base-side one end 91 having the secondary conductor 82 fixed thereto toward the other end 92 on the tip side opposite to the base side.

Figure 5:
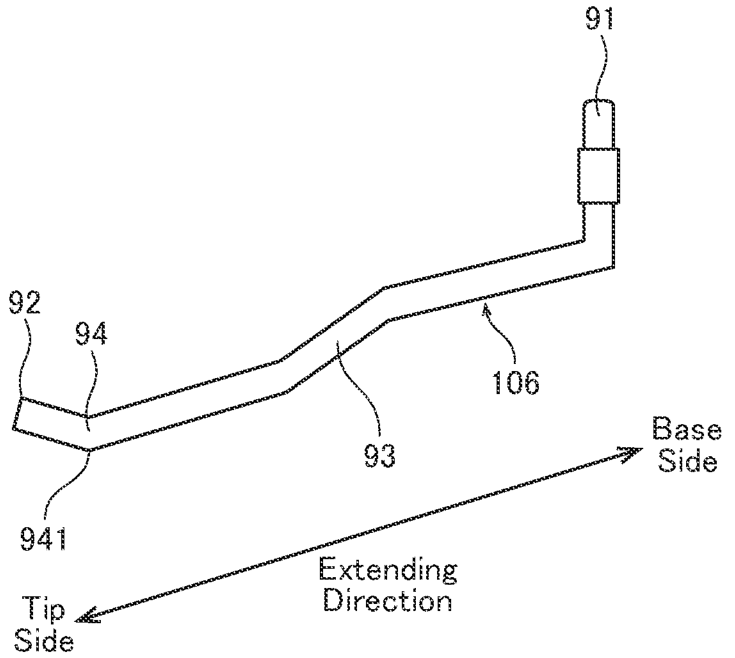
FIG. 5 is a schematic view of the lead terminal according to the first preferred embodiment.

FIG. 5 is a schematic view of the lead terminal 106. As shown in FIG. 5, the lead terminal 106 includes a step part 93 bending between the base-side end 91 and the tip-side end 92. The step part 93 is a part bending near the center of the lead terminal 106 along the extending direction thereof. While the coil assembly 103, the lead terminal 106, and the noise prevention resistor 107 are held in the case 108, the step part 93 is inclined in a direction in which it gets closer to the noise prevention resistor 107 than the other parts as it heads from the base-side one end 91 toward the other end 92 on the tip side opposite to the base side.

The inclusion of the above-described step part 93 in the lead terminal 106 can reduce occurrence of contact between a part closer to the base side (closer to the one end 91) than the step part 93 and the first bottom 612 of the case 108 or a short circuit due to contact between a part closer to the tip side (closer to the other end 92) than the step part 93 and the coil assembly 103.

Further, as shown in FIG. 5, the lead terminal 106 includes a V-shaped part 94 in a position closer to the tip side (closer to the other end 92) than the step part 93. When the coil assembly 103 and the lead terminal 106 are held in the case 108 with the noise prevention resistor 107 having been held in the second space 620 of the case 108, a bottom 941 of the V-shaped part 94 is directed toward the noise prevention resistor 107. Then, the bottom 941 of the lead terminal 106 can be caused to slide easily while being brought into contact with the exposed surface 50 of the noise prevention resistor 107. This enables absorption of a tolerance that can occur during manufacture of the lead terminal 106. As a result, contact between the lead terminal 106 and the noise prevention resistor 107 can be prevented from being degraded due to such a possible tolerance, details of which will be provided later.

Figure 6:
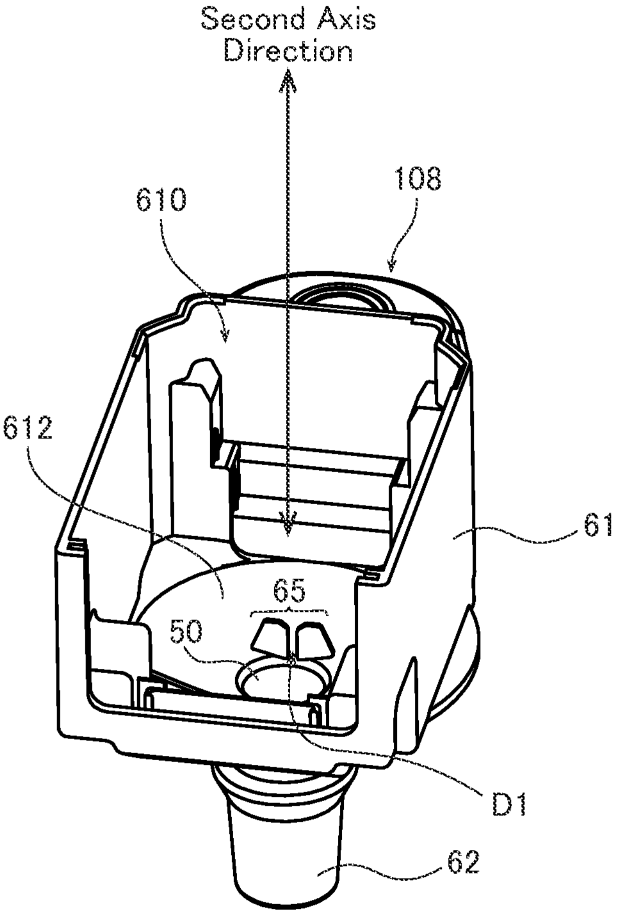
FIG. 6 is a perspective view of a first holding section and a second holding section of the case according to the first preferred embodiment.

FIG. 6 is a perspective view of the first holding section 61 and the second holding section 62 of the case 108. As shown in FIG. 6, the first bottom 612 of the first holding section 61 is provided with a pair of guides 65. The pair of guides 65 protrude toward the first space 610. However, the position of the pair of guides 65 is not limited to the first bottom 612. It is only required that the pair of guides 65 protrude toward the first space 610 in at least a part of the case 108.

Figure 7:
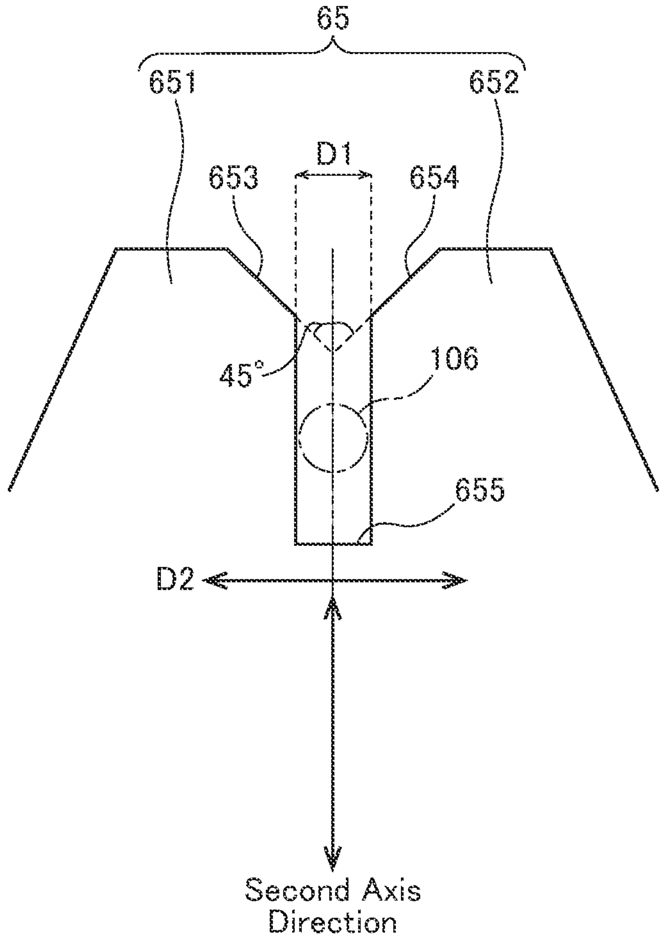
FIG. 7 is a schematic view of a pair of guides when seen from a direction perpendicular to an arrangement direction of the guides and a second axis direction, according to the first preferred embodiment.

FIG. 7 is a schematic view of the pair of guides 65 when seen from a direction perpendicular to an arrangement direction D2 of guide pieces 651 and 652 forming the pair of guides 65 and perpendicular to the second axis direction. In FIG. 7, the lead terminal 106 passing through a gap D1 between the pair of guides 65 is indicated by lines with alternate long and short dashes. While the coil assembly 103, the lead terminal 106, and the noise prevention resistor 107 are held in the case 108, the lead terminal 106 passes through the gap D1 between the pair of guides 65 and is in contact with the exposed surface 50 of the noise prevention resistor 107. This reduces deviation of the lead terminal 106 in the arrangement direction D2 of the guide pieces 651 and 652 forming the pair of guides 65. In other words, the lead terminal 106 is prevented from transversely deviating from the winding center axis Rc or the extending direction of the lead terminal 106.

In the first preferred embodiment, while the coil assembly 103, the lead terminal 106, and the noise prevention resistor 107 are held in the case 108, a part closer to the tip side (closer to the other end 92) than the step part 93 in the lead terminal 106 passes through the gap D1 between the pair of guides 65 and is in contact with the exposed surface 50 of the noise prevention resistor 107. This further reduces transverse deviation of the lead terminal 106 from the winding center axis Rc or the extending direction of the lead terminal 106.

In the first preferred embodiment, the gap D1 between the pair of guides 65 has a width smaller than the width of the exposed surface 50. Because of this, a part close to the tip side (close to the other end 92) in the lead terminal 106 is prevented from being detached from the exposed surface 50 even in case of slight transverse oscillation of the lead terminal 106 in the gap D1 between the pair of guides 65.

As shown in FIG. 7, tapered surfaces 653 and 654 are formed in the guide pieces 651 and 652 forming the pair of guides 65. Each of the tapered surfaces 653 and 654 is inclined in a direction in which it gets closer to a bottom 655 of the gap D1. Each of the tapered surfaces 653 and 654 in the first preferred embodiment is at an approximately 45° angle to the second axis direction. The provision of these tapered surfaces 653 and 654 allows the lead terminal 106 to be easily inserted into the gap D1 between the pair of guides 65 when the coil assembly 103 and the lead terminal 106 are held in the first space 610 of the case 108.

Figure 8:
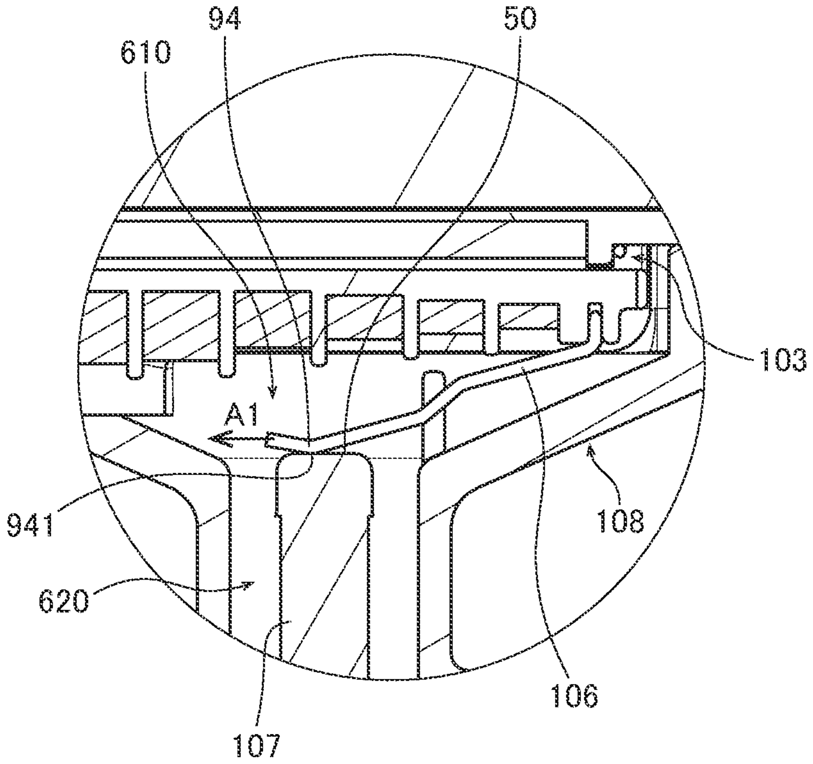
FIG. 8 is a partial longitudinal sectional view of the coil assembly, the lead terminal, and the noise prevention resistor that are held in the case, according to the first preferred embodiment.

The noise prevention resistor 107 is previously held in the second space 620 before the coil assembly 103 and the lead terminal 106 are held in the first space 610 as described above. FIG. 8 is a partial longitudinal sectional view of the coil assembly 103, the lead terminal 106, and the noise prevention resistor 107 that are held in the case 108. As shown in FIG. 8, when the coil assembly 103 and the lead terminal 106 are held in the first space 610 of the case 108 with the noise prevention resistor 107 having been held in the second space 620 of the case 108, the bottom 941 of the V-shaped part 94 in the lead terminal 106 slides in an direction indicated by an arrow A1 while coming into contact with the exposed surface 50 of the noise prevention resistor 107.

As instances of a tolerance that can occur during manufacture of the lead terminal 106, there are thought of an instance where the lead terminal 106 is slightly shorter and an instance where the lead terminal 106 is slightly longer. In the instance where the lead terminal 106 is slightly shorter, when the coil assembly 103 and the lead terminal 106 are held in the first space 610 of the case 108, the bottom 941 of the V-shaped part 94 in the lead terminal 106 slides in the direction indicated by the arrow A1 while coming into contact with the exposed surface 50 of the noise prevention resistor 107 as described above. Then, after the coil assembly 103 and the lead terminal 106 are thoroughly held in the first space 610, the bottom 941 is kept in contact with the exposed surface 50. That is, the bottom 941 functions as a contact point (first contact point) with the exposed surface 50. As a result, not only the lead terminal 106 and the noise prevention resistor 107, but also the secondary conductor 82 of the secondary coil L2 fixed to the lead terminal 106 and the noise prevention resistor 107, are electrically connected to each other, and those connections can be kept excellent.

Figure 9:
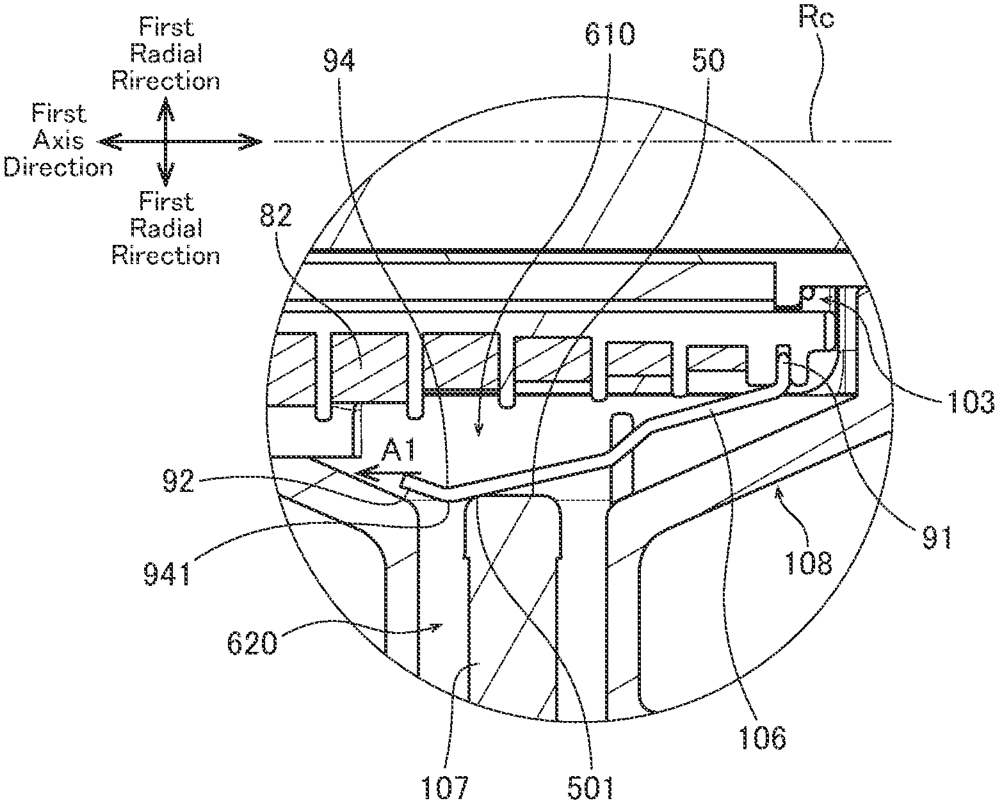
FIG. 9 is a partial longitudinal sectional view of the coil assembly, the lead terminal, and the noise prevention resistor that are held in the case, according to a modification.

On the other hand, in the instance where the lead terminal 106 is slightly longer, as one of the instances of a tolerance that can occur during manufacture of the lead terminal 106, as shown in a modification in FIG. 9, when the coil assembly 103 and the lead terminal 106 are held in the first space 610 of the case 108, the bottom 941 of the V-shaped part 94 in the lead terminal 106 slides in the direction indicated by the arrow A1 while coming into contact with the exposed surface 50 of the noise prevention resistor 107, and further, the bottom 941 passes through a region above the exposed surface 50.

However, as described above, the lead terminal 106, while extending along the winding center axis Rc, is inclined substantially in a direction in which it gets closer to the noise prevention resistor 107 as it heads from the base-side one end 91 having the secondary conductor 82 fixed thereto toward the other end 92 on the tip side opposite to the base side. Because of this configuration, a part slightly closer to the base side (closer to the one end 91) than the bottom 941 in the lead terminal 106 is in contact with a corner 501 of the exposed surface 50 even in a case where the bottom 941 passes through a region above the exposed surface 50. Thus, after the coil assembly 103 and the lead terminal 106 are thoroughly held in the first space 610, the part slightly closer to the base side (closer to the one end 91) than the bottom 941 is kept in contact with the corner 501 of the exposed surface 50. That is, the part slightly closer to the base side (closer to the one end 91) than the bottom 941 functions as a contact point (second contact point) with the exposed surface 50. As a result, not only the lead terminal 106 and the noise prevention resistor 107, but also the secondary conductor 82 of the secondary coil L2 fixed to the lead terminal 106 and the noise prevention resistor 107, are electrically connected to each other, and those connections can be kept excellent.

Figure 10:
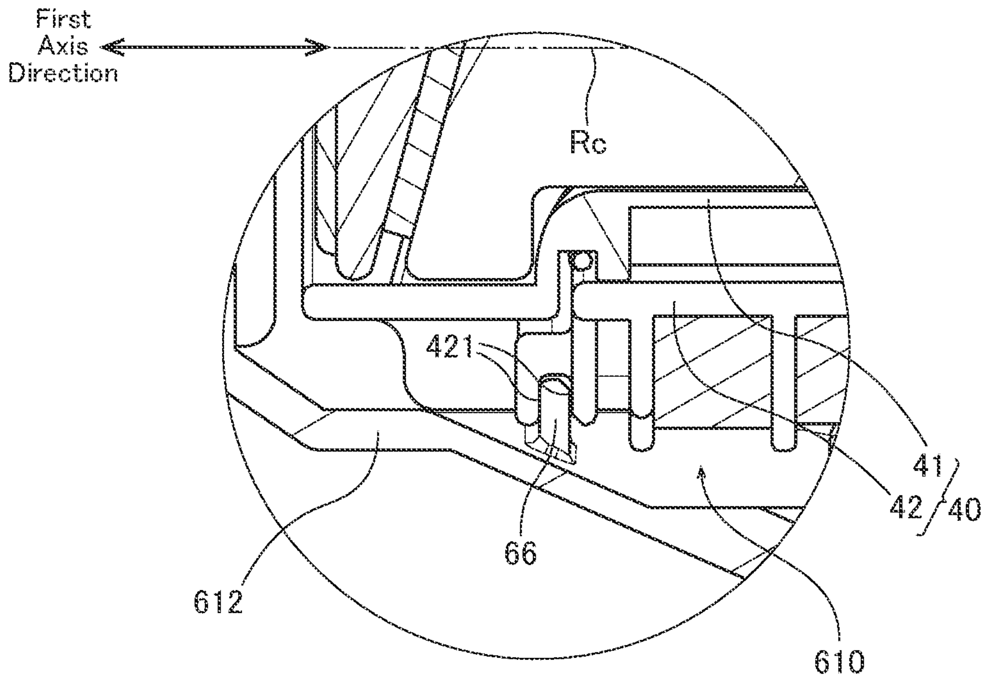
FIG. 10 is another partial longitudinal sectional view of the coil assembly, the lead terminal, and the noise prevention resistor that are held in the case, according to the first preferred embodiment.

FIG. 10 is another partial longitudinal sectional view of the coil assembly 103, the lead terminal 106, and the noise prevention resistor 107 that are held in the case 108. As shown in FIG. 10, the secondary bobbin 42 of the first preferred embodiment includes an engagement part 421. The engagement part 421 extends in a plate-like shape along a direction perpendicular to the winding center axis Rc. As shown in FIG. 10, the first bottom 612 of the first preferred embodiment is further provided with an alignment part 66. The alignment part 66 protrudes in a plate-like shape toward the first space 610. However, the position of the alignment part 66 is not limited to the first bottom 612. It is only required that the alignment part 66 is provided so as to protrude in a plate-like shape toward the first space 610 in at least a part of the case 108.

While the coil assembly 103, the lead terminal 106, and the noise prevention resistor 107 are held in the case 108, the engagement part 421 of the secondary bobbin 42 is engaged with the alignment part 66. This reduces deviation of the coil assembly 103 and the lead terminal 106 from the case 108 including the alignment part 66, along the winding center axis Rc in the first axis direction.

Further, in the first preferred embodiment, while the engagement part 421 is engaged with the alignment part 66, a gap extending along the first axis direction between the engagement part 421 and the alignment part 66 has a width smaller than the width of the exposed surface 50. In other words, a range within which the engagement part 421 is movable along the winding center axis Rc is smaller than the width of the exposed surface 50. This prevents a part close to the tip side (close to the other end 92) in the lead terminal 106 fixed to the secondary bobbin 42 from being detached from the exposed surface 50 even in case of slight oscillation of the secondary bobbin 42 including the engagement part 421 in the first axis direction with respect to the alignment part 66.

As described above, in the first preferred embodiment, because of the foregoing configurations of the lead terminal 106 and the case 108, the secondary conductor 82 of the secondary coil L2 and the noise prevention resistor 107 can be electrically connected and the connection can be kept excellent without intervention of a high-voltage terminal therebetween. Further, a tolerance that can occur during manufacture of the lead terminal 106 is absorbed, thereby preventing contact between the lead terminal 106 and the noise prevention resistor 107 from being degraded due to such a possible tolerance.

2. Modifications

While the exemplary preferred embodiment of the present invention has been described hereinabove, the present invention is not limited to the foregoing preferred embodiment.

The ignition coil for use in an internal combustion engine according to the present invention can be any device installable on various types of devices or industrial machines such as power generators in addition to vehicles such as automobiles, and available for use for igniting fuel by generating electric sparks at spark plugs of internal combustion engines.

The detailed shape or configuration of the ignition coil for use in an internal combustion engine described above can be changed appropriately within a range without deviating from the purport of the present invention. Additionally, the foregoing elements in the embodiment or modifications described above may be combined together, as appropriate, without inconsistencies.

What is claimed is:

1. An ignition coil for use in an internal combustion engine comprising:

a coil assembly including a primary coil and a secondary coil;

a lead terminal electrically connected to the secondary coil;

a noise prevention resistor electrically connected to a spark plug that performs an ignition operation in a combustion chamber of the internal combustion engine, the noise prevention resistor being configured to reduce an ignition noise; and a case holding the coil assembly, the lead terminal, and the noise prevention resistor, wherein an internal space of the case includes;

a first space holding the coil assembly and the lead terminal; and a second space that is continuous with the first space and holds the noise prevention resistor, the case includes a pair of guides protruding toward the first space, and while the coil assembly, the lead terminal, and the noise prevention resistor are held in the case, the lead terminal passes through a gap between the pair of guides and is in contact with an exposed surface exposed to the first space in the noise prevention resistor.

2. The ignition coil according to claim 1, wherein the gap between the pair of guides has a width smaller than a width of the exposed surface.

3. The ignition coil according to claim 1, wherein a material of the lead terminal is brass.

4. The ignition coil according to claim 1, wherein the coil assembly includes:

the primary coil formed by winding of a primary conductor on a primary bobbin about a winding center axis in a peripheral direction;

the secondary coil formed by winding of a secondary conductor on a secondary bobbin about the winding center axis in the peripheral direction; and an iron core electromagnetically coupling the primary coil and the secondary coil to each other, and while the coil assembly, the lead terminal, and the noise prevention resistor are held in the case, the lead terminal extends along the winding center axis and is inclined in a direction in which the lead terminal gets closer to the noise prevention resistor as it heads from a base side fixed directly or indirectly to the secondary conductor toward a tip side opposite to the base side.

5. The ignition coil according to claim 4, wherein the lead terminal includes a step part bending between one end on the base side and the other end on the tip side, and while the coil assembly, the lead terminal, and the noise prevention resistor are held in the case, the step part bends in a direction in which the step part gets closer to the noise prevention resistor as it heads from the base side toward the tip side, and a part closer to the tip side than the step part in the lead terminal passes through the gap between the pair of guides and is in contact with the exposed surface.

6. The ignition coil according to claim 5, wherein the part closer to the tip side than the step part in the lead terminal includes a V-shaped part, and when the coil assembly and the lead terminal are held in the case with the noise prevention resistor having been held in the case, a bottom of the V-shaped part slides while coming into contact with the exposed surface of the noise prevention resistor.

7. The ignition coil according to claim 4, wherein the secondary bobbin includes an engagement part extending in a plate-like shape along a direction perpendicular to the winding center axis, and the case further includes an alignment part protruding in a plate-like shape toward the first space, and while the coil assembly and the lead terminal are held in the case, the engagement part is engaged with the alignment part.

8. The ignition coil according to claim 7, wherein while the engagement part is engaged with the alignment part, a range within which the engagement part is movable along the winding center axis is smaller than a width of the exposed surface.

* * * * *